(12) United States Patent
Lutzky et al.

(10) Patent No.: US 11,290,509 B2
(45) Date of Patent: Mar. 29, 2022

(54) NETWORK DEVICE FOR MANAGING A CALL BETWEEN USER TERMINALS

(71) Applicant: Fraunhofer-Gesellschaft zur Förderung der angewandten Forschung e.V., Munich (DE)

(72) Inventors: Manfred Lutzky, Nuremberg (DE); Stefan Döhla, Erlangen (DE); Martin Dietz, Nuremberg (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 97 days.

(21) Appl. No.: 16/674,879

(22) Filed: Nov. 5, 2019

(65) Prior Publication Data
US 2020/0068001 A1 Feb. 27, 2020

Related U.S. Application Data

(63) Continuation of application No. PCT/EP2018/063019, filed on May 17, 2018.

(30) Foreign Application Priority Data

May 18, 2017 (EP) .................... 17171843

(51) Int. Cl.
*H04L 29/06* (2006.01)
*H04L 65/60* (2022.01)
(Continued)

(52) U.S. Cl.
CPC ........ *H04L 65/605* (2013.01); *H04L 65/1069* (2013.01); *H04L 65/608* (2013.01);
(Continued)

(58) Field of Classification Search
CPC . H04L 65/605; H04L 65/1069; H04L 65/608; H04L 69/24
See application file for complete search history.

(56) References Cited

U.S. PATENT DOCUMENTS 5,909,663 A 6/1999 Iijima et al.
8,015,000 B2 9/2011 Juin-Hwey et al.
(Continued)

FOREIGN PATENT DOCUMENTS

CN 101140759 A 3/2008
CN 104158814 A 11/2014
(Continued)

OTHER PUBLICATIONS

O.E. Groshev, "Office Action for RU Application No. 2020118947", Dec. 1, 2020, ROSPATENT, Russia.
(Continued)

*Primary Examiner* — Jackie Zuniga Abad
(74) *Attorney, Agent, or Firm* — Novick, Kim & Lee, PLLC; Jae Youn Kim; Jihun Kim

(57) ABSTRACT

A network device for managing a call between user terminals checks whether a first user terminal supports usage of a first audio coding mode for the call, and a second user terminal intends to use a second audio coding mode for the call, and, if the first user terminal supports the usage of the first audio coding mode, and the second user terminal intends to use the second audio coding mode, repacks first data of the call sent from the first user terminal to the second user terminal and packetized into first packets referring to the second audio coding mode, into second packets referring to the first audio coding mode; and repacks second data of the call sent from the second user terminal to the first user
(Continued)

terminal and packetized into third packets referring to the second audio coding mode, into fourth packets referring to the first audio coding mode.

8 Claims, 3 Drawing Sheets

(51) Int. Cl.
 *H04L 65/1069* (2022.01)
 *H04L 65/65* (2022.01)
 *H04L 69/24* (2022.01)
 *H04L 65/10* (2022.01)
 *H04L 65/1016* (2022.01)

(52) U.S. Cl.
 CPC .......... *H04L 69/24* (2013.01); *H04L 65/1006* (2013.01); *H04L 65/1016* (2013.01)

(56) References Cited

U.S. PATENT DOCUMENTS

| | | | |
|---|---|---|---|
| 8,473,301 | B2 | 6/2013 | Chen et al. |
| 8,554,549 | B2 | 10/2013 | Toshiyuki et al. |
| 9,123,350 | B2 | 9/2015 | Zhao et al. |
| 2003/0101050 | A1 | 5/2003 | Vladimir et al. |
| 2008/0320148 | A1 | 12/2008 | Capuozzo et al. |
| 2011/0125505 | A1 | 5/2011 | Philleppe et al. |
| 2015/0371647 | A1 | 12/2015 | Faure et al. |
| 2016/0308919 | A1 | 10/2016 | Hori |
| 2016/0360448 | A1 | 12/2016 | Hori |
| 2016/0365097 | A1 | 12/2016 | Guan et al. |
| 2017/0054777 | A1* | 2/2017 | Leung ................. H04M 7/0072 |
| 2017/0103769 | A1 | 4/2017 | Laaksonen et al. |
| 2017/0117985 | A1 | 4/2017 | Bruhn et al. |
| 2017/0154631 | A1 | 6/2017 | Stefan et al. |
| 2017/0221495 | A1 | 8/2017 | Eun-Mi et al. |
| 2018/0048748 | A1* | 2/2018 | Lundstrom ............. H04L 65/80 |

FOREIGN PATENT DOCUMENTS

| | | |
|---|---|---|
| CN | 105100046 A | 11/2015 |
| CN | 106033982 A | 10/2016 |
| EP | 3139696 A1 | 3/2017 |
| JP | H1091194 A | 4/1998 |
| JP | 2007-049415 A | 2/2007 |
| JP | 2011-166453 A | 8/2011 |
| JP | 2014-241641 A | 12/2014 |
| JP | 2016-149671 A | 8/2016 |
| KR | 10-2014-0102984 A | 8/2014 |
| RU | 2400937 C2 | 9/2010 |
| RU | 2419891 C2 | 5/2011 |
| RU | 2015136540 A | 3/2017 |
| RU | 2016105619 A | 8/2017 |
| WO | 2015/063045 A1 | 5/2015 |
| WO | 2015/129181 A1 | 9/2015 |
| WO | 2016/057507 A1 | 4/2016 |
| WO | 2016/142337 A1 | 9/2016 |
| WO | 2016/184281 A1 | 11/2016 |
| WO | 2016/185649 A1 | 11/2016 |

OTHER PUBLICATIONS

O.I. Starukhina, "Office Action for RU Application No. 2020118968", Dec. 23, 2020, ROSPATENT, Russia.
Yamagishi Noboru, "Office Action for JP Application No. 2019-563364" Jan. 26, 2021, JPO, Japan.
Ajay Singh Meena, "Office Action for IN Application No. 201917044232" Jan. 29, 2021, Intellectual Property India, India.
GSM Association Official Document FCM.01—VoLTE Service Description and Implementation Guidelines Version 2.0 Oct. 7, 2014.
3GPP TS 26.445 V14.2.0, Annex A3.3.3, 3rd Generation Partnership Project; Technical Specification Group Services and System Aspects; Codec for Enhanced Voice Services (EVS); Detailed Algorithmic Description (Release 14) Dec. 2017.
GSM Association Official Document IR.92—IMS Profile for Voice and SMS Version 12.0 May 2, 2018.
Xinmeng Li, "Office Action for CN Application No. 201880032463. 2", Jun. 29, 2021, CNIPA, China.

* cited by examiner

| | Originating UE<br>EVS + AMR-WB capable | IMS | Terminating UE<br>AMR-WB capable | |
|---|---|---|---|---|
| SIP Invite | SDP offer ⟶<br>a=rtpmap:96 EVS/16000/1<br>a=fmtp:96 br=5.9-24.4; bw=nb-swb<br>a=rtpmap:97 EVS/16000/1<br>a=rtpmap:98 AMR-WB/16000<br>a=fmtp:98 mode_set=0,1,2<br>(400a) | (400) | | 210 |
| | | SDP offer ⟶<br>a=rtpmap:96 EVS/16000/1<br>a=fmtp:96 br=5.9-24.4; bw=nb-swb<br>a=rtpmap:98 AMR-WB/16000<br>a=fmtp:98 mode_set=0,1,2<br>(400b) | | 220 |
| SIP 183 Progress | | SDP answer ⟵<br>a=rtpmap:98 AMR-WB/16000<br>a=fmtp:98 mode_set=0,1,2 | | 230 |
| | SDP answer ⟵<br>(modification 1a – map AMR-WB to EVS IO)<br>a=rtpmap:96 EVS/16000/1<br>a=fmtp:96 br=5.9-24.4; bw=nb-swb, mode-set=0,1,2; evs-mode-switch=1<br>(402a, 402b) | | | 240 |
| SIP UPDATE | SDP offer ⟶<br>a=rtpmap:96 EVS/16000/1<br>a=fmtp:96 br=5.9-24.4; bw=nb-swb, mode-set=0,1,2; evs-mode-switch=1 | | | 250 |
| | | SDP offer ⟶<br>(modification 3b – map EVS to AMR-WB)<br>a=rtpmap:98 AMR-WB/16000<br>a=fmtp:98 mode_set=0,1,2 | | 260 |
| SIP 200 OK | | SDP answer ⟵<br>a=rtpmap:98 AMR-WB/16000<br>a=fmtp:98 mode_set=0,1,2 | | 270 |
| | SDP answer ⟵<br>(modification 1a – map AMR-WB to EVS IO)<br>a=rtpmap:96 EVS/16000/1<br>a=fmtp:96 br=5.9-24.4; bw=nb-swb, mode-set=0,1,2; evs-mode-switch=1 | | | 280 |

FIG. 2

| | Originating UE AMR-WB capable | IMS | Terminating UE EVS+AMR-WB capable | |
|---|---|---|---|---|
| SIP Invite | SDP offer ⟶<br>a=rtpmap:96 AMR-WB/16000<br>a=fmtp:96 mode_set=0,1,2 | | | 310 |
| | | SDP offer ⟶<br>(modification 2 - probe for EVS supports)<br>a=rtpmap:97 EVS/16000/1<br>a=fmtp:97 br=5.9-24.4; bw=nb-swb, mode-set=0,1,2; evs-mode-switch=1<br>a=rtpmap:96 AMR-WB/16000<br>a=fmtp:96 mode_set=0,1,2 | | 320 |
| SIP 183 Progress | | SDP answer ⟵<br>a=rtpmap:97 EVS/16000/1<br>a=fmtp:97 br=5.9-24.4.2; bw=nb-swb, mode-set=0,1,2; evs-mode-switch=1 | | 330 |
| | SDP answer ⟵<br>(modification 3a – map EVS to AMR-WB)<br>a=rtpmap:96 AMR-WB/16000<br>a=fmtp:96 mode_set=0,1,2 | | | 340 |
| SIP UPDATE | SDP offer ⟶<br>a=rtpmap:96 AMR-WB/16000<br>a=fmtp:96 mode_set=0,1,2 | | | 350 |
| | | SDP offer ⟶<br>(modification 1b – map AMR-WB to EVS)<br>a=rtpmap:97 EVS/16000/1<br>a=fmtp:97 br=5.9-24.4.2; bw=nb-swb, mode-set=0,1,2; evs-mode-switch=1 | | 360 |
| SIP 200 OK | | SDP answer ⟵<br>a=rtpmap:97 EVS/16000/1<br>a=fmtp:97 br=5.9-24.4.2; bw=nb-swb, mode-set=0,1,2; evs-mode-switch=1 | | 370 |
| | SDP answer ⟵<br>(modification 3a – map EVS to AMR-WB)<br>a=rtpmap:96 AMR-WB/16000<br>a=fmtp:96 mode_set=0,1,2 | | | 380 |

FIG. 3

NETWORK DEVICE FOR MANAGING A CALL BETWEEN USER TERMINALS

CROSS-REFERENCES TO RELATED APPLICATIONS

This application is a continuation of copending International Application No. PCT/EP2018/063019, filed May 17, 2018, which is incorporated herein by reference in its entirety, and additionally claims priority from European Application No. EP 17 171 843.0, filed May 18, 2017, which is incorporated herein by reference in its entirety.

The present invention relates to a network device, in particular to a network device for managing a call between user terminals.

BACKGROUND OF THE INVENTION

A communication system may comprise a number of user terminals which are connected to a network device. The network device may manage calls between the individual user terminals. In the following, the terms "managing network device" and "network device" are used interchangeably.

There exist different codecs that are implemented to implement the communication between user terminals. Different codecs provide different coding quality and may also use different computational power. One of the codecs may be the Enhanced Voice Services, EVS, codec. EVS can be used for super wideband and full band VoLTE services described in GSMA "IMS Profile for Voice and SMS" IR.92.

An advantage of EVS is an improved speech and audio quality as compared to Adaptive Multi-Rate Wideband, AMR-WB, and that audio bandwidth is extended and a significant higher robustness against packet loss is featured. EVS contains primary modes and AMR-WB interoperable modes. In the following, AMR-WB IO will be used as a synonym for the AMR-WB interoperable mode, in an alternative implementation using RFC4867 as the payload format, and EVS TO will be used as a synonym for AMR-WB interoperable mode using the EVS Real-Time Transport Protocol, RTP, payload format.

The EVS primary modes provide EVS's full speech and audio quality as well as robustness against packet loss, hence this should be selected if both user terminals/UEs (user equipments) support EVS.

However, it is not guaranteed that all terminals or UEs in the network support the EVS mode. Hence heterogeneous network conditions may have to be met, while maintaining the best possible audio quality and robustness for the participating terminals.

Based on these considerations, the object of the present invention is to provide a new managing concept which enables an improved communication technique between user terminals with higher robustness and improved speech and audio quality.

SUMMARY

According to an embodiment, a network device for managing a call between user terminals may be configured to: check whether a first user terminal supports a usage of a first audio coding mode for the call, and a second user terminal intends to use a second audio coding mode for the call; if the first user terminal supports the usage of the first audio coding mode for the call, and the second user terminal intends to use the second audio coding mode for the call, repack first data of the call sent from the first user terminal to the second user terminal and packetized into first packets referring to the first audio coding mode, into second packets referring to the second audio coding mode; and repack second data of the call sent from the second user terminal to the first user terminal and packetized into third packets referring to the second audio coding mode, into fourth packets referring to the first audio coding mode; wherein the network device may be further configured to: check whether a first initial call offer sent from an originating user terminal to a terminating user terminal indicates a usage of the second audio coding mode for the call; if the first initial call offer indicates the usage of the second audio coding mode for the call, intercept the first initial call offer and forward a second initial call offer to the terminating user terminal instead of the first initial call offer, the second initial call offer indicating a usage of the first audio coding mode for the call; check whether a first answer to the second initial call offer, sent from the terminating user terminal to the originating user terminal indicates the usage of the first audio coding mode for the call; if the first answer indicates the usage of the first audio coding mode for the call, intercept the first answer and forward a second answer to the originating user terminal instead of the first answer, the second answer indicating the usage of the second audio coding mode for the call; and assert that the terminating user terminal supports the usage of the first audio coding mode for the call and the originating user terminal intends to use the second audio coding mode for the call so that the terminating user terminal is the first user terminal and the originating user terminal is the second user terminal.

According to an embodiment, a network device for managing calls between user terminals checks whether a first user terminal supports a usage of a first audio coding mode for a call, and a second user terminal intends to use a second audio coding mode for the call, and if the first user terminal supports the usage of the first audio coding mode for the call, and the second user terminal intends to use the second audio coding mode for the call, repacking first data of the call sent from the first user terminal to the second user terminal and packetized into first packets referring to the second audio coding mode, into second packets referring to the first audio coding mode and repacking second data of the call sent from the second user terminal to the first user terminal and packetized into third packets referring to the second audio coding mode into fourth packets referring to the first audio coding mode. This has the advantage that EVS capabilities can be exploited to a best possible degree in a mixed mode environment having e.g. EVS and AMR-WB terminals.

In a further embodiment, the network device may perform the check during a call setup between the first and second user terminals.

In a further embodiment, the network device may check whether a first initial call offer sent from an originating user terminal to a terminating user terminal indicates a usage of the second audio coding mode for the call, and if the first initial call offer indicates the usage of the second audio coding mode for the call, intercept the first initial call offer and forward a second initial call offer to the terminating user terminal instead of the first initial call offer, the second initial call offer indicating a usage of the first audio coding mode for the call, check whether a first answer to the second initial call offer, sent from the terminating user terminal to the originating user terminal indicates the usage of the first audio coding mode for the call, and if the first answer indicates the usage of the first audio coding mode for the call, intercept the first answer and forward a second answer to the originating user terminal instead of the first answer, the second answer indicating the usage of the second audio coding mode for the call, and assert that the terminating user terminal supports the usage of the first audio coding mode for the call and the originating user terminal intends to use the second audio coding mode for the call so that the terminating user terminal is the first user terminal and the originating user terminal is the second user terminal.

In a further embodiment, the first initial call offer sent from the originating user terminal to the terminating user terminal may subordinately indicates a usage of the first audio coding mode for the call.

In a further embodiment, the network device may, if the first answer indicates the usage of the second audio coding mode for the call, forward the first answer to the originating user terminal, the first answer indicating the usage of the second audio coding mode for the call, and assert that neither the first user terminal nor the second user terminal supports the usage of the first audio coding mode for the call.

In a further embodiment, the network device may check whether a first answer sent from a terminating user terminal to an originating user terminal in response to a first initial call offer sent from the originating user terminal to the terminating user terminal and indicating a usage of any of a group of one or more audio coding modes for the call to which the first audio coding mode belongs, indicates the usage of the second audio coding mode, and if the first answer indicates the usage of the second audio coding mode for the call, may intercept the first answer and forward a second answer to the originating user terminal instead of the first answer, the second answer indicating a usage of the first audio coding mode for the call and assert that the originating user terminal supports the usage of the first audio coding mode for the call and the terminating user terminal intends to use the second audio coding mode for the call so that the originating user terminal the first user terminal and the terminating user terminal the second user terminal.

In a further embodiment, the first initial call offer sent from the originating user terminal to the terminating user terminal may, at least, subordinately indicate a usage of the first audio coding mode.

In a yet further embodiment, the network device may check whether the first initial call offer indicates the usage of the first audio coding mode, and if so, may intercept the first initial call offer (310) and forward a second initial call offer (320) instead of the first initial call offer (310), the second initial call offer (320) indicating the usage of a plurality of audio coding modes including the first audio coding mode and the second audio coding mode.

In a further embodiment, the second audio coding mode may be the AMR-WB, and the first audio coding mode may be the AMR-WB interoperable mode of EVS.

In a further embodiment, the second audio coding mode may be the AMR-WB using the RTP format for AMR WB, and the first audio coding mode may be the AMR-WB interoperable mode of EVS using the RTP format for EVS.

In a further embodiment, the first and second audio coding modes may represent audio content using equal coding syntax or using equally parsable payload or mutually transferable to each other without transcoding. For example, without transcoding may refer to being mutually transferable without the need for re-quantizing.

In a further embodiment, the first and second packets may coincide in content of their payload sections, and the third and fourths packets may coincide in content of their payload sections except for optional non-transcoding operations.

In a further embodiment, the network device may leave payload sections of the first and third packets unamended in repacking except for optional non-transcoding operations in repacking.

BRIEF DESCRIPTION OF THE DRAWINGS

Embodiments of the present invention will be detailed subsequently referring to the appended drawings, in which:

FIG. 2 shows a signaling sequence between user equipments according to an embodiment of the present invention; and FIG. 3 shows another signaling sequence between user equipments according to another embodiment of the present invention.

DETAILED DESCRIPTION OF THE INVENTION

Figure 1:
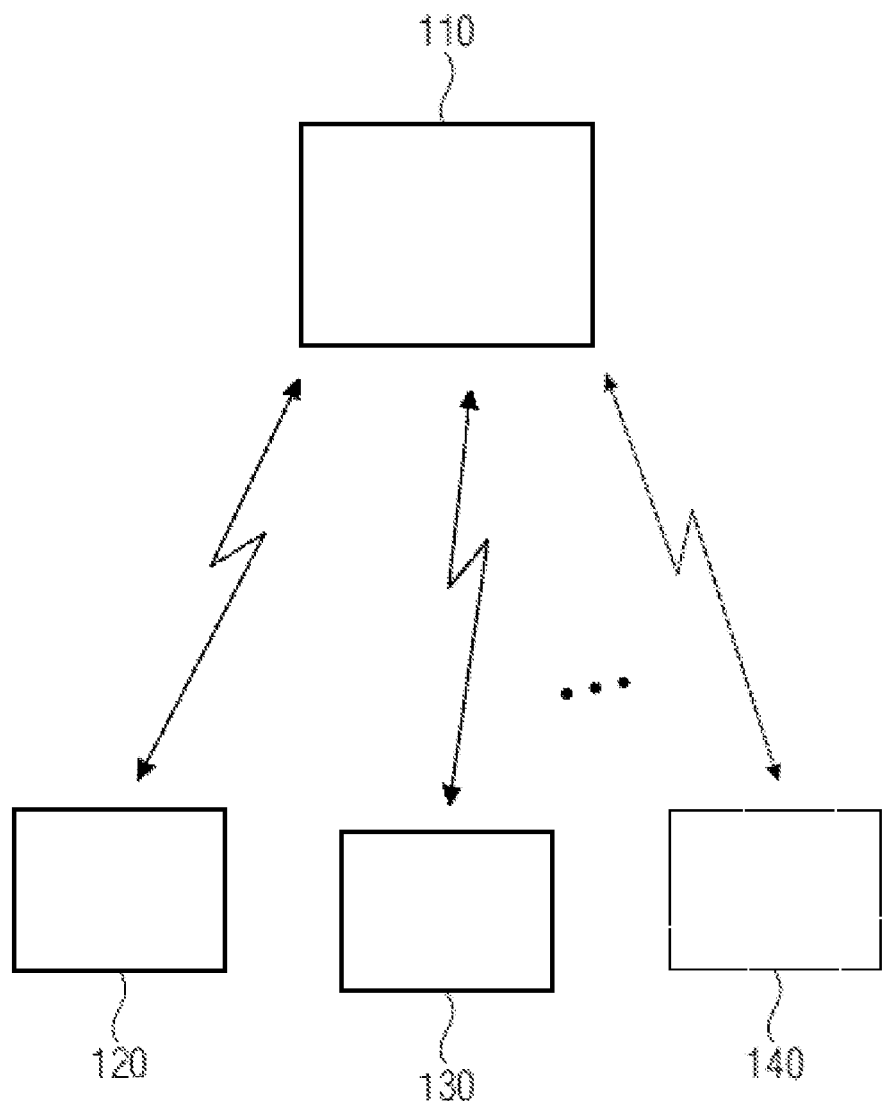
FIG. 1 shows a conceptual network device connected to user terminals according to an embodiment of the present invention.

As mentioned before, it is advantageous to use the EVS mode, as it provides improved audio quality and robustness. In cases where all terminals participating in the call, the so-called "call legs", are able to use EVS, EVS will be used as foreseen.

In cases where only one call leg supports EVS, for example a UE, and probably also the network it is connected to, supports EVS and the other UE or its connected network is not capable for supporting EVS and supports only AMR-WB, an improved error robustness of EVS can still be exploited by the usage of EVS in the EVS-supported call leg.

According to a concept of this application, the usage of EVS in networks with heterogeneous device capabilities, or if networks with different codec capabilities are interconnected, is enforced. The technique relies on an SDP modification in SIP network nodes, which can be e.g. CSCF or ATCF network nodes in the IMS.

With this technique, it is assumed, that migration to high-quality EVS calls is sped up as the EVS implementations in the EVS-capable terminals can already be exercised even if no end-to-end EVS calls are possible due to an initial lack of devices supporting EVS.

This concept can be facilitated by using EVS primary mode in the EVS call leg and perform a transcoding to AMR-WB in the network. The EVS call leg then benefits from the excellent error robustness, both in the uplink and the downlink. The improved EVS error robustness especially in channel aware mode allows to relax BLER target in the call leg which corresponds to an improved signal to noise ratio SNR and indoor/outdoor cell coverage.

Also, the EVS IO mode can be used and a re-packaging in the network can be performed. This re-packaging procedure is executed already during Single Radio Voice Call Continuity, SRVCC, where during an EVS VoLTE to VoLTE call, one UE switches to the CS network and thus needs to switch to AMR-WB. In this case an EVS codec can be continuously used before and after switching the network. The codec can be switched from primary to EVS IO mode to fulfill interoperability with both networks. This also enables the use case where EVS IO mode is directly negotiated during the call setup. It is likely advantageous with regard to error robustness and audio quality to use EVS IO instead of legacy AMR-WB.

In the following, active network nodes in Control and User Plane are assumed, which analyze the data packets and are able to modify them. The acronym IMS (IP Multimedia Subsystem) will be used as a synonym for all network nodes in the Evolved Packet Core, EPC, and IMS involved in the call setup.

As described before, the oUE and tUE may not communicate directly, but via an IMS that may manage the communication. In case the AMR-WB (adaptive multi rate wideband) codec is negotiated, the UEs (e.g the oUE and tUE) may use the AMR-WB IO mode as the alternative implementation of AMR-WB for the sending and/or receiving side. This behavior may be beneficial over legacy AMR-WB. As it is in the UE vendor's sole discretion to implement AMR-WB using AMR-WB IO or not, the operator or the IMS network cannot force the UE to do so.

In the following, a technique is discussed where the operator or the IMS network forces an EVS-capable UE to use the built-in AMR-WB interoperable modes through EVS IO mode for a call to a non EVS capable UE, e.g. instead of legacy AMR-WB. This may be implemented by the following SDP modifications during call establishment:

In a first category of modifications, the oUE supports EVS including EVS-IO and the tUE supports only AMR-WB.

In this first category, according to modification 1a, when receiving the answer of the tUE to the initial offer of the oUE, the IMS knows that the oUE supports the EVS-IO mode and that the tUE only supports AMR-WB. According to modification 1b, the IMS replaces i) the AMR-WB by "EVS starting in EVS IO mode" in this and subsequent answers, and ii) "EVS starting in EVS IO mode" with AMR-WB in subsequent offers.

In a second category of modifications, the oUE supports only AMR-WB and the tUE supports EVS including EVS-IO.

In this second category, according to modification 2a, when receiving an initial offer from the oUE (only containing AMR-WB), the IMS adds "EVS starting in EVS IO mode" to the offer forwarded to the tUE.

According to modification 2b, if the tUE answers with "EVS starting in EVS IO mode", the IMS knows that oUE supports only AMR-WB, but tUE supports EVS IO mode.

According to modification 2c, the IMS replaces i) "EVS starting in EVS IO mode" by AMR-WB in this and subsequent answers, and ii) AMR-WB by "EVS starting in EVS IO mode" in subsequent offers.

For example, in a system with two terminals, UE1 and UE2, a case may occur where the IMS knows that UE1 supports only AMR-WB and UE2 supports EVS and therefore maps AMR-WB to EVS IO.

According to modification 1a, the IMS Network replaces "AMR-WB" by "EVS", in particular the EVS IO capability in an answer message, if the answer contains AMR-WB but not EVS and an initial offer contained EVS.

According to modification 1b, the IMS Network replaces "AMR-WB" by "EVS", in particular EVS IO capability in an offer message, if the offer contains AMR-WB but not EVS and the initial answer message contained EVS.

According to modification 2, the tUE may be probed for EVS IO support. In this case, the IMS Network adds EVS IO capability to a call offer, if the offer contains AMR-WB but no EVS. The IMS 'knows' that UE1 supports EVS and UE2 only supports AMR-WB and therefore maps EVS IO to AMR-WB.

According to a third class of modifications, in particular for modification 3a, the IMS Network replaces EVS IO by AMR-WB capability in an answer message if the answer message contains EVS IO and the initial call offer did not contain EVS.

Further, in the third class of modifications, according to modification 3b, the IMS Network replaces EVS IO by AMR-WB capability in the call offer, if the call offer contains EVS IO and the initial answer message did not contain EVS.

The SDP modifications during the offer-answer along with the relevant parts of SIP commands will be discussed later on in relation to FIGS. 2 and 3. It is to be noted that the message sequence is reduced to the codec negotiation relevant messages. Also, SDP messages are shortened in order to improve readability. The two examples given are based on single PMN call establishment examples discussed in section 3.2 of "GSMA FCM.01—VoLTE Service Description and Implementation Guide (Version 2.0)". Further information can be found in "3GPP 26445 Annex A3.3.3" which contains a detailed description of the usage of SDP Parameters, and in "GSMA IR.92 chapter 2.4.3.3" which describes EVS specific SDP restrictions for VoLTE.

All modifications are assumed to be implemented in the IMS network instances already mangling SDP messages, e.g. they may be implemented in P-CSCF or other IMS network instances such as the ATCF (Access Transfer Control Function) already present for SRVCC. The re-packaging may be implemented e.g. in Media Resource Function Processor (MRFP) (tbc.) or Access Transfer Gateways (ATGW).

FIG. 1 shows a system 100 comprising a network device 110 according to the present invention. The network device 110 checks whether a first user terminal 120 is able to support the usage of a first audio coding mode for the call and checks whether a second user terminal 130 intends to use a second audio coding mode for the call. In this embodiment, the first audio coding mode and the second audio coding mode may be different, and the first audio coding mode may refer to EVS, whereas the second audio coding mode may refer to AMR-WB. It is clear to the skilled person that the mentioned audio modes are merely examples and also may comprise different coding techniques.

The network device 110, in the case that the first user terminal 120 supports the usage of the first audio coding mode and the second user terminal intends to use the second audio coding mode for the call, repacks the data sent from the first user terminal 120 to the second user terminal 130, which is packetized into first packets referring to the second audio coding mode into second packets referring to the first audio coding mode. Vice versa, second data of the call sent from the second user terminal 130 sent to the first user terminal 110, packetized into third packets referring to the second audio coding mode into fourth packets referring to the first audio coding mode.

In the system that comprises the network device 110, the first user terminal 120, the second user terminal 130 and possibly also further user terminals 140, it is assumed that active network nodes in the control and user plane are present, with IMS used as a synonym for all network nodes in the EPC and IMS involved in the call setup. The originating user terminal or user equipment corresponds to the before-mentioned oUE, and the terminating UE to the before-mentioned tUE.

In general, the oUE sends and receives data from the IMS, which is the IP multimedia subsystem to which the user equipment or user terminals are connected to. Also the tUE is connected to the IMS, hence a communication between oUE and tUE is facilitated via the IMS.

When establishing the codec used for communication, and in case the AMR-WB will be used, the UEs may use the AMR-WB IO mode as the alternative implementation of AMR-WB for the sending and/or receiving side. As mentioned before, this behavior is beneficial over legacy AMR-WB, but it is in the UE vendor's discretion to implement AMR-WB using AMR-WB IO, and the UE cannot be forced to do so by the IMS network.

In the following, a technique is provided where the operator/IMS network forces an EVS capable UE to use the built-in AMR-WB into operable modes through EVS IO mode for a call to a non-EVS capable UE, instead of legacy AMR-WB. This may be implemented by the before-discussed SDP modifications during call establishment.

When receiving the answer of the tUE to the initial offer of the oUE, the IMS knows that the oUE supports the EVS-IO mode and the tUE only supports AMR-WB. The IMS replaces the AMR-WB by "EVS starting in EVS IO mode" in this and subsequent answers and "EVS starting in EVS IO mode" with AMR-WB in subsequent offers.

FIG. 1 depicts network device 110 in communication with the two user terminals 120 and 130. As described before, the network device 110 checks whether the terminals intend to use a particular audio coding mode for a call. For example, the network device 110 may check whether the first terminal 120 intends to use an audio coding mode related to the EVS standard and whether the second user terminal 130 intends to use a different audio coding mode, for example AMR.

As long as the first and second user terminals intend to use a common audio coding mode, the communication may be performed without further efforts. In the case that the first user terminal 120 supports the EVS related audio coding mode, in the following called first audio coding mode, and the second user terminal intends to use the AMR related audio coding mode, in the following referred to as second audio coding mode, the network device 110 has to make further efforts. In more detail, the network device 110 repacks the data sent from the first user terminal 120 from the first to the second audio coding mode and repacks data sent from the second user terminal from the second audio coding mode into the first audio coding mode.

Usually, the network device performs the check as to whether which of the audio coding modes are intended to be used by the individual user terminals during the call setup. Nevertheless, it is not absolutely necessary to perform this check during the call setup but it may also be possible that this check is performed even after the call is already established. This can be the case when the audio coding modes used in the call may have to be changed, for example to adapt to limited bandwidth conditions or considerations regarding computational power of the user terminal.

In the example that the check is performed already during the call setup, the network device 110 checks whether a first initial call offer sent from the originating user terminal indicates that the second audio coding mode is intended to be used for the call or whether the first audio coding mode is advantageous. In the case that it is indicated that the second audio coding mode is to be used, this first initial call offer is intercepted and, instead of this, a second initial call offer is sent to the terminating user terminal, wherein the second initial call offer indicates that the first audio coding mode is to be used for the call.

Similarly, the network device 110 checks if the answer on the second initial call offer indicates that the first audio coding mode is to be used for the call, then this first answer is intercepted and replaced/forwarded by a second answer to the originating user terminal instead of the first answer, such that the second answer indicates the usage of the second audio coding mode. This interception and replacement of the call offer and its answer ensure that it appears for the originating user terminal that the second audio coding mode is used, and it appears to the terminating user terminal that the first audio coding mode is to be used for the call. In other words, this asserts that the terminating user terminal supports the usage of the first audio coding mode and the originating user terminal intends to use the second audio coding mode.

The first initial call offer, sent from the originating user terminal to the terminating user terminal, subordinately indicates the usage of the first audio coding mode for the call.

It has been described above what happens when the first initial call offer indicates the usage of the second audio coding mode, hereafter, the answer to this call offer is discussed. If the first answer indicates the usage of the second audio coding mode for the call to be performed, a first answer to the originating user terminal is forwarded to the originating user terminal, wherein the first answer indicates that the second audio coding mode is used for the call. It is asserted that neither the first user terminal nor the second user terminal supports the usage of the first audio coding mode for the call.

After having received the first answer from the terminating user terminal in response to a first initial call offer from the originating to the terminating user terminal indicates the usage of the second audio coding mode and also indicates that any of a group of audio coding modes for the call to which the first audio coding mode belongs is to be used is checked. If the first answer indicates the usage of the second audio coding mode for the call, the first answer is intercepted and instead a second answer is forwarded to the originating user terminal, the second answer indicating the usage of the first audio coding mode for the call. Further, it is asserted that the originating user terminal supports the usage of the first audio coding mode and the terminating user terminal intends to use the second audio coding mode for the call.

In an embodiment, the first initial call offer may subordinately indicate the usage of the first audio coding mode.

In another embodiment, the network device may check whether the first initial call offer, which was sent from the originating user terminal to the terminating user terminal, indicates the usage of the first audio coding mode, and if so, may intercept the first initial call offer and instead forward a second initial call offer that indicates the usage of a plurality of audio coding modes including the first audio coding mode and the second audio coding mode.

It is apparent that different audio coding modes can be used and in embodiments the second audio coding mode may be the AMR-WB mode and the first audio coding mode may be the AMR-WB interoperable mode of EVS.

In further embodiments, the second audio mode may be the AMR-WB mode using the RTP format for AMR-WB and the first audio coding mode is the AMR-WB interoperable mode of EVS using the RTP format for EVS. Nevertheless, it is clear to the person skilled in the art that the presently discussed invention is not limited to the before mentioned audio coding modes but can be used also for other audio coding modes.

In regard to the audio coding modes, these modes may represent audio content using equal coding syntax or using equally parsable payload or mutually transferable to each other without transcoding. Without transcoding may, for example, be without the need of re-quantizing.

When transferring the data encoded in the different audio coding modes, this data is transferred in the form of packets. The person skilled in the art is aware that a packet contains a payload section and that the first and second packets referring to first and second audio data coincide in content with regard to their payload sections. Further, third and fourth packets, corresponding to data sent from the second to the first user terminal user, may coincide in content of their payload sections except for optional non-transcoding operations.

The network device may be configured to leave the payload section unamended of the first and third packets during repacking, except for an optional non-transcoding operation during repacking.

FIG. 2 shows an example of a signaling sequence of a communication between an originating user equipment, oUE, which is capable of EVS and AMR-WB, and a terminating user equipment capable, tUE, of using AMR-WB. These user equipments may be connected to a managing network device as described before, the managing network device is capable of communicating using both EVS and AMR-WB and translates/converts messages between EVS and AMR-WB.

This managing network device may be an IP Multimedia Subsystem, IMS, as described in the following example.

In step 210, an SDP offer is sent from the oUE to the IMS. This message indicates that both EVS and AMR-WB may be used. In step 220, the message is forwarded from the IMS to the tUE. In this message, only the AMR-WB mode is mentioned. Step 210 and step 220 represent an "SIP invite" message. Steps 210 and 220 relate to check 400a where it is checked, using the call offer, whether the terminals support the usage of the first and/or second audio coding mode and which audio coding mode is indicated for the call.

As a response to the SIP invite, a message, in this case an SDP answer, is sent in step 230 from the tUE to the IMS, this message is in the AMR-WB format. In step 240, the message is forwarded from the IMS to the oUE, converted into the EVS mode. Steps 230 and 240 represent an "SIP 183 'progress'" message. Steps 230 and 240 relate to the check 400b where it is checked, using the SDP answer, which audio coding mode is indicated for the call.

In step 250, an SIP offer is sent from the oUE to the IMS using the EVS mode. Step 250 relates to an "SIP update" message. In step 260, the SDP offer message is sent from the IMS to the tUE, using the AMR-WB mode.

In step 270, an SDP answer message is sent from the tUE to the IMS using the AMR-WB. Step 270 relates to an "SIP 200 'OK'" message. In step 280, the SDP answer message is forwarded to the oUE using the EVS mode.

In this embodiment the EVS IO is used on the oUE, and AMS-WB is used on the tUE. The network, here represented by the IMS, may perform the repackaging to facilitate the connection between the oUE and the tUE. Here, a transcoding is not necessary.

Further, in this embodiment, the before mentioned modification 1a (IMS network modifies SDP answer by exchanging AMR-WB with EVS-IO)) and modification 3b (IMS network exchanges EVS IO by AMR-WB (in 2nd SDP offer)) are applied.

FIG. 3 shows a similar signaling sequence/signal flow as shown and described in relation to FIG. 2 between an originating user equipment, oUE and a terminating user equipment, tUE, but in this case the oUE is capable of AMR-WB, and the tUE is capable of EVS and AMR-WB. Also here, the oUE and tUE may be connected to a managing network device as described before, the managing network device being capable of communicating using both EVS and AMR-WB and translating/converting messages between EVS and AMR-WB. This managing network device may be an IP Multimedia Subsystem, IMS.

In step 310, an "SDP offer" is sent from the oUE to the IMS in the AMR-WB mode. In step 320, the SDP offer is sent/forwarded from the IMS to the tUE, in this case in the EVS mode. Steps 310 and 320 may be related to an "SIP invite". Steps 310 and 320 relate to the check 400c where it is checked, using the call offer, whether the terminals support the usage of the first and/or second audio coding mode and which audio coding mode is indicated for the call.

In step 330, an "SDP answer" is sent from the tUE to the IMS using the EVS mode. In step 340, the SDP answer is forwarded from the IMS to the oUE, using the AMR-WB mode. Both steps 330 and 340 may be related to an "SIP 183 'progress'" message. Steps 330 and 340 relate to the check 400d where it is checked, using the SDP answer, which audio coding mode is indicated for the call.

In step 350, an "SDP offer" message is sent from the oUE to the IMS using the AMR-WB mode. Step 350 may be related to an "SIP update" message. In step 360, the SDP offer is forwarded from the IMS to the terminating UE using the EVS mode.

In step 370, an "SDP answer" message is sent from the tUE to the IMS using the EVS mode. Step 370 may be related to an "SIP 200 'OK'" message. In step 380, the SDP answer of step 370 is forwarded from the IMS to the oUE using the AMR-WB mode.

In this embodiment the EVS IO is used on the tUE, and AMS-WB is used on the oUE. The network, here represented by the IMS, may perform the repackaging to facilitate the connection between the oUE and the tUE. Also here, a transcoding is not necessary.

Further, in this embodiment, the before mentioned modification 2 (IMS network adds EVS IO to SDP offer to probe tUE for EVS (in initial SDP offer)), modification 3a (IMS network exchanges EVS IO by AMR-WB (in SDP answer)) and modification 1b (IMS network exchanges AMR-WB by EVS IO (in 2nd SDP offer)) are applied.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

An audio signal encoded according to the present invention can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may preferably be performed by any hardware apparatus.

The apparatus described herein may be implemented using a hardware apparatus, or using a computer, or using a combination of a hardware apparatus and a computer.

The apparatus described herein, or any components of the apparatus described herein, may be implemented at least partially in hardware and/or in software.

The methods described herein may be performed using a hardware apparatus, or using a computer, or using a combination of a hardware apparatus and a computer.

The methods described herein, or any components of the apparatus described herein, may be performed at least partially by hardware and/or by software.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A network device for managing a call between user terminals, configured to:
check whether a first user terminal supports a usage of a first audio coding mode for the call, and a second user terminal intends to use a second audio coding mode for the call, wherein the second audio coding mode is an Adaptive Multi-Rate Wideband (AMR-WB) mode using a Real-Time Transport Protocol (RTP) format for AMR-WB and the first audio coding mode is an Enhanced Voice Services (EVS) audio coding mode using an AMR-WB interoperable mode of EVS using the RTP format for EVS;
if the first user terminal supports the usage of the first audio coding mode for the call, and the second user terminal intends to use the second audio coding mode for the call,
  repack first data of the call sent from the first user terminal to the second user terminal and packetized into first packets referring to the first audio coding mode, into second packets referring to the second audio coding mode; and
  repack second data of the call sent from the second user terminal to the first user terminal and packetized into third packets referring to the second audio coding mode, into fourth packets referring to the first audio coding mode,
wherein the network device is further configured to:
check whether a first initial call offer sent from an originating user terminal to a terminating user terminal indicates a usage of the second audio coding mode for the call;
if the first initial call offer indicates the usage of the second audio coding mode for the call,
  intercept the first initial call offer and forward a second initial call offer to the terminating user terminal instead of the first initial call offer, the second initial call offer indicating a usage of the first audio coding mode for the call;
check whether a first answer to the second initial call offer, sent from the terminating user terminal to the originating user terminal indicates the usage of the first audio coding mode for the call;
if the first answer indicates the usage of the first audio coding mode for the call,
  intercept the first answer and forward a second answer to the originating user terminal instead of the first answer, the second answer indicating the usage of the second audio coding mode for the call; and
  assert that the terminating user terminal supports the usage of the first audio coding mode for the call and the originating user terminal intends to use the second audio coding mode for the call so that the terminating user terminal is the first user terminal and the originating user terminal is the second user terminal.

2. The network device according to claim 1, configured to perform the checking during a call setup between the first and second user terminals.

3. The network device according to claim 1, wherein the first initial call offer sent from the originating user terminal to the terminating user terminal subordinately indicates a usage of the first audio coding mode for the call.

4. The network device according to claim 1, configured to
if the first answer indicates the usage of the second audio coding mode for the call,
  forward the first answer to the originating user terminal, the first answer indicating the usage of the second audio coding mode for the call, and
  assert that neither the first user terminal nor the second user terminal supports the usage of or intends to use the first audio coding mode for the call.

5. The network device according to claim 1, configured to:
check whether a third answer sent from a further terminating user terminal to a further originating user terminal in response to a third initial call offer sent from the further originating user terminal to the further terminating user terminal and indicating a usage of any of a group of one or more audio coding modes for the call to which an EVS audio coding mode belongs, indicates the usage of the second audio coding mode;
if the third answer indicates the usage of the second audio coding mode for the call,
  intercept the third answer and forward a fourth answer to the further originating user terminal instead of the third answer, the fourth answer indicating a usage of the EVS audio coding mode including the use of the AMR-WB interoperable mode of EVS; and
  assert that the originating user terminal supports the usage of the first audio coding mode for the call and the terminating user terminal intends to use the second audio coding mode for the call so that the originating user terminal is the first user terminal and the terminating user terminal is the second user terminal.

6. The network device according to claim 5, configured to modify the third answer to become the fourth answer by adding a flag indicating the AMR-WB interoperable mode of EVS to the indication of the usage of the EVS audio coding mode.

7. The network device according to claim 5, wherein the network device is configured to:
check whether the third initial call offer sent from the originating user terminal to the terminating user terminal indicates a usage of the EVS audio coding mode without indicating a usage of the second audio coding mode; and
if the third initial call offer indicates the usage of the EVS audio coding mode and no usage of the second audio coding mode,
  intercept the third initial call offer and forward a fourth initial call offer instead of the third initial call offer, the fourth initial call offer indicating the usage of a plurality of audio coding modes comprising the EVS audio coding mode and the second audio coding mode.

8. The network device according to claim 1, configured to leave payload sections of the first and third packets unamended in repacking except for optional non-transcoding operations in repacking.

* * * * *